Oct. 22, 1929. T. O. McLENDON ET AL 1,732,978

PISTON RING

Filed June 11, 1927

INVENTOR
T. O. McLendon &
BY J. H. Irving

ATTORNEY

Patented Oct. 22, 1929

1,732,978

UNITED STATES PATENT OFFICE

THOMAS O. McLENDON AND JAMES H. IRVING, OF VALDOSTA, GEORGIA

PISTON RING

Application filed June 11, 1927. Serial No. 198,122.

This invention relates to a piston intended especially for use in internal combustion engines, but which may permissibly be applied to steam engines. The object of the invention is to provide a piston adapted to fit a wide range of cylinder diameters and which will automatically compensate for wear of the cylinder into which it is fitted.

Referring now to the drawings.

Figure 1:
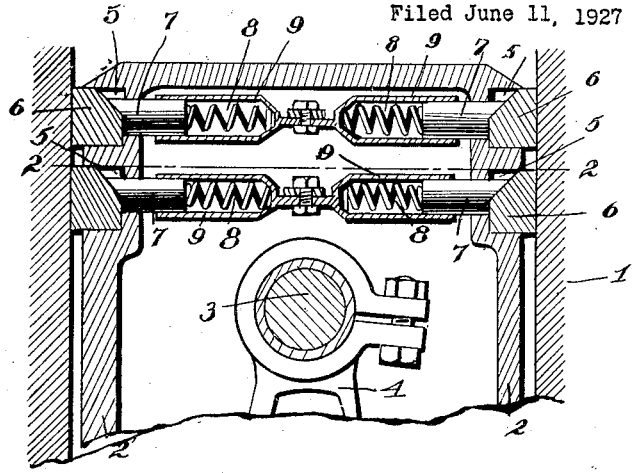
Figure 1 shows a side elevation in vertical section of a piston embodying our invention.

Referring again to Figures 1 and 2, numeral 1 indicates the wall of the engine cylinder while 2 is the body or shell of the piston. 3 indicates the customary wrist pin and 4 the crank. The piston shell has also the customary grooves for piston rings, such grooves being shown at 5. It is to be understood that any suitable number of grooves and rings therefor may be used. The piston rings themselves are indicated by numerals 6. These are not ordinary rings, since they have their top inside edges beveled off, but in other respects they are no different from the customary rings.

Through the piston shell, there are a number of holes (four in the construction shown in Figure 1) drilled in each groove 5, in the lower portion of same. The holes are for the accommodation of an equal number of presser pins 7, which extend through them. The outer ends of the pins are partially beveled and partially straight as shown, so that they will fit the beveled inner side of the piston rings and exert a certain downward and outward pressure on the said rings. Owing to the fact that the pins 7 are pressed outward by springs 8, good contact is maintained between the cylinder walls and the piston rings, so that the escape of gas or oil past the rings is substantially prevented.

The retaining means for the springs 8 and pins 7 is a "spider" consisting substantially of four tubes or shells 9, open at their outer ends and closed as to their inner ends. The inner ends of each two shells are joined together by means of flat tangs. The construction may be that of a tube flattened in its middle portion. Two such flattened tubes are crossed at right angles so that the flat portions overlie each other. They are then adjustably fastened together by means of a bolt and bolt hole drilled through both tubes. The springs and presser pins are then inserted. The entire assembled device is then slipped into the piston shell before the wrist pin has been placed therein. The presser pins are allowed to come through the openings in the shell already provided for them and so against the inner piston ring surfaces. The piston is then inserted in the cylinder.

Figure 3:
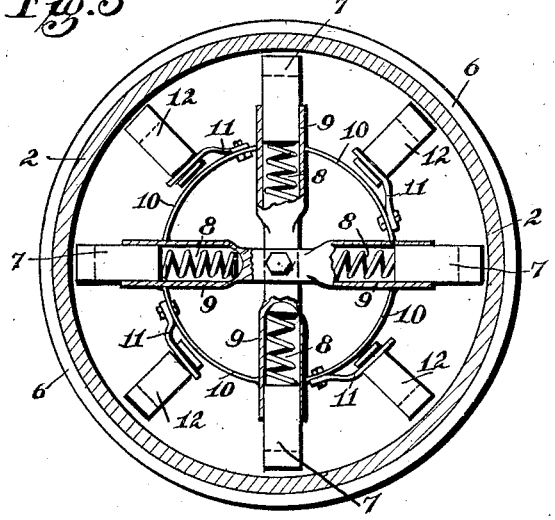
Figure 3 shows a horizontal cross section of a piston embodying another form of our invention. This view is taken on a line corresponding to 2—2 of Figure 1.
Figure 5:
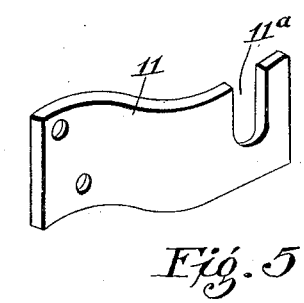
Figure 5 is a perspective view of a spring clip used in the embodiment shown in Figure 3.

In the modification shown in Figure 3, the number of presser pins is increased from four to eight. Since it would be mechanically very difficult if not impossible to provide a satisfactory spider of this description with eight legs, the spider in this case is made with only four, as before, but each leg has fastened to it a quadrant 10 of sheet metal. To one end of the quadrant is bolted a spring clip 11, also of sheet metal. Figure 3 shows the shape of this clip clearly and also the U shaped notch 11a therein near its end.

Figure 4:
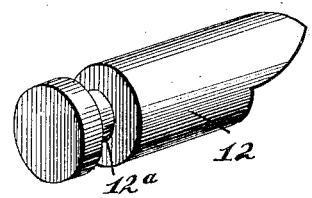
Figure 4 is a perspective view of a presser pin used in the embodiment shown in Figure 3.

As will be seen from Figure 3, the clip stands out from the quadrant 10 considerably, the distance between the notch 11a and the wall of the cylinder being such that it is just sufficient to accommodate the length of presser pin 12 (shown in Figures 3 and 4). It will of course be evident that additional holes are drilled into piston shell to accommodate the added presser pins. The latter are provided near their inner ends with a deep groove 12a extending completely around their circumferences. The shank thus formed is adapted to fit the notch 11a tightly, so that when 12 and 11 are assembled together as shown in Figure 3, approximately the same pressure will be produced on the added four pins as on the four original ones. By the use of the auxiliary pins, a more even pressure on the piston ring may be maintained.

Figure 2:
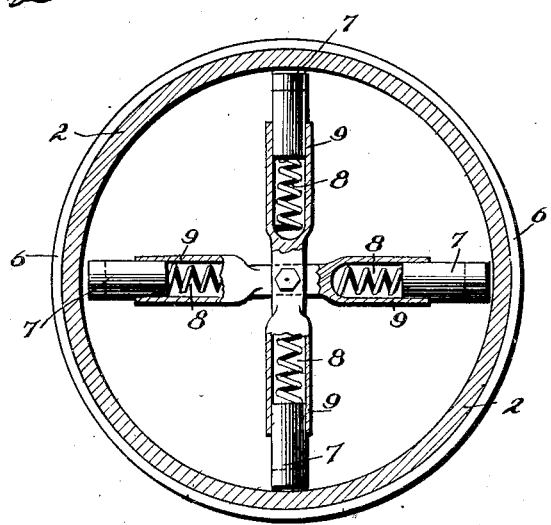
Figure 2 shows a horizontal cross section of the piston taken on the line 2—2 of Figure 1, with parts broken away.

It will be readily understood by those skilled in the art that the pressing devices may be superposed as shown in Figure 1 of the drawings and also that as many of them may be used in one piston as is desirable. Other modifications may be made without departing from the spirit of our invention and all such modifications we claim as our own if they fairly fall within the scope of the appended claims.

We claim:

1. In combination, a hollow piston body, a plurality of grooves around the circumference of said body, a gas check ring in each groove, said rings being beveled as to their top inner edges and a plurality of pins extending through said piston body, the outer ends of the said pins fitting the inner edges of the said rings and spring means within the piston adapted to exert a steady outward pressure on the pins and rings, said spring means being retained in a pair of crossed tubular members flattened as to their middle portions and bolted together through said flattened middle portions and adapted to house the spring means.

2. In combination, a hollow piston body, a plurality of grooves around the circumference of said body, a gas check ring in each groove, said rings being beveled as to their top inner edges and a plurality of pins extending through said piston body, the outer ends of the said pins fitting the inner edges of the said rings and spring means within the piston adapted to exert a steady outward pressure on the pins and rings, a pair of crossed tubular members flattened as to their middle portions and bolted together through said flattened middle portions, said spring means being retained in the tubular members and auxiliary spring pressing means comprising sheet metal quadrants attached to each of said of the tubular members, spring clips fastened to said quadrants and extending outwardly therefrom, said clips having U shaped notches therein near their outer ends, presser pins within the notches, the said pins being adapted to engage the inner sides of the piston rings and press them outwardly.

3. A device for increasing the obturating qualities of piston rings comprising a plurality of hollow tubular shells closed at one end, flat shanks on the closed ends of the shells joining the shells together in pairs end to end, the shanks of a plurality of the joined shells being superposed upon each other and bolted together, the shells containing each a coil spring and a pin beveled at its outer end.

4. A device for increasing the obturating qualities of piston rings comprising a plurality of hollow tubular shells closed at one end, flat shanks on the closed ends of the shells joining the shells together in pairs end to end, the shanks of a plurality of the joined shells being superposed upon each other and bolted together, the shells containing each a coil spring and a pin beveled at its outer end, and a plurality of auxiliary pressing pins, said pins being retained in spring clips fastened to sheet metal quadrants extending between the main presser pin holding members and being fastened thereto.

5. A device for increasing the obturating qualities of piston rings comprising a plurality of hollow tubular shells closed at one end, shanks on the closed ends of the shells joining the shells together in pairs end to end, each shell containing a coil spring and a pin forced outwardly from the shell by the spring, the outer free end of the pin being provided with a shoulder, and a bevelled edge to engage the inner face of a ring.

THOMAS O. McLENDON.
JAMES H. IRVING.